United States Patent
Cho et al.

(10) Patent No.: US 11,561,656 B2
(45) Date of Patent: Jan. 24, 2023

(54) TOUCH PANEL AND DISPLAY APPARATUS INCLUDING THE SAME

(71) Applicant: Samsung Display Co., Ltd., Yongin-si (KR)

(72) Inventors: Sunhaeng Cho, Hwaseong-si (KR); Jiwon Han, Anyang-si (KR); Ki-Hyun Cho, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 131 days.

(21) Appl. No.: 15/254,381

(22) Filed: Sep. 1, 2016

(65) Prior Publication Data

US 2017/0212629 A1  Jul. 27, 2017

(30) Foreign Application Priority Data

Jan. 26, 2016  (KR) .......... 10-2016-0009533

(51) Int. Cl.
*G06F 3/044* (2006.01)

(52) U.S. Cl.
CPC .......... *G06F 3/0443* (2019.05); *G06F 3/0446* (2019.05); *G06F 3/0448* (2019.05); *G06F 2203/04111* (2013.01); *G06F 2203/04112* (2013.01)

(58) Field of Classification Search
CPC .......... G06F 3/046; G06F 3/048; G06F 3/044; G06F 3/0418; G06F 3/043; G06F 2203/04111; G06F 2203/04112
USPC .................................................. 345/173–174
See application file for complete search history.

(56) References Cited

U.S. PATENT DOCUMENTS

| 8,917,252 B2 | 12/2014 | Kuriki |
| 8,941,595 B2 | 1/2015 | Dews |
| 9,507,389 B2 | 11/2016 | Ryu et al. |
| 2007/0074914 A1* | 4/2007 | Geaghan ............... G06F 3/0445 178/18.06 |
| 2009/0315854 A1* | 12/2009 | Matsuo ................. G06F 3/0443 345/174 |

(Continued)

FOREIGN PATENT DOCUMENTS

| CN | 102483669 | 5/2012 |
| CN | 103649881 | 3/2014 |

(Continued)

*Primary Examiner* — Michael A Faragalla
*Assistant Examiner* — Sujit Shah
(74) *Attorney, Agent, or Firm* — H.C. Park & Associates, PLC (57) ABSTRACT

A display apparatus including: a display panel including a base member; a first touch electrode disposed on the base member and extending in a first direction; a second touch electrode including touch patterns spaced apart from one another in a second direction crossing the first direction and a bridge pattern connecting two of the touch patterns adjacent to each other in the second direction, the touch patterns being disposed on the base member and spaced apart from the first touch electrode; and a dummy pattern disposed between the first touch electrode and the second touch electrode. The first touch electrode includes a first mesh pattern and first peripheral patterns protruding from the first mesh pattern, and a peripheral border of the first peripheral patterns has an obtuse angle or a curved shape.

18 Claims, 9 Drawing Sheets

(56) References Cited

U.S. PATENT DOCUMENTS

| | | | |
|---|---|---|---|
| 2011/0025639 A1* | 2/2011 | Trend | G06F 3/044 345/174 |
| 2011/0141039 A1* | 6/2011 | Lee | G06F 3/044 345/173 |
| 2012/0075214 A1* | 3/2012 | Kim | G06F 3/041 345/173 |
| 2012/0169665 A1 | 7/2012 | Misaki | |
| 2014/0022199 A1* | 1/2014 | Peng | G06F 3/044 345/174 |
| 2014/0078074 A1* | 3/2014 | Oh | G06F 3/041 345/173 |
| 2014/0098057 A1* | 4/2014 | Lee | G06F 3/0443 345/174 |
| 2014/0152921 A1* | 6/2014 | Yashiro | G06F 3/044 349/12 |
| 2014/0174896 A1* | 6/2014 | Sun | G06F 3/044 200/278 |
| 2014/0216790 A1* | 8/2014 | Trauernicht | G06F 3/044 174/253 |
| 2014/0313434 A1* | 10/2014 | Kim | G02F 1/13338 349/12 |
| 2015/0049053 A1* | 2/2015 | Kim | G06F 3/0443 345/174 |
| 2015/0062457 A1* | 3/2015 | Kida | G06F 3/044 349/12 |
| 2015/0077361 A1* | 3/2015 | Seo | B60R 1/088 345/173 |
| 2015/0090573 A1* | 4/2015 | Mansky | H03K 17/9618 200/5 R |
| 2015/0220179 A1* | 8/2015 | Kimura | G06F 3/0446 345/174 |
| 2015/0242016 A1* | 8/2015 | Yun | G06F 3/0446 345/174 |
| 2015/0253810 A1* | 9/2015 | Shin | G06F 1/16 345/174 |
| 2015/0253901 A1* | 9/2015 | Chan | G06F 3/044 427/555 |
| 2015/0363023 A1* | 12/2015 | Kawaguchi | G06F 3/044 345/174 |
| 2016/0103526 A1* | 4/2016 | Sohn | G06F 3/0445 345/174 |

FOREIGN PATENT DOCUMENTS

| | | |
|---|---|---|
| JP | 2013-191069 | 9/2013 |
| KR | 10-2011-0079807 | 7/2011 |
| KR | 10-2012-0018059 | 2/2012 |
| KR | 10-2013-0102121 | 9/2013 |
| KR | 10-2014-0069072 | 6/2014 |
| KR | 10-2014-0137823 | 12/2014 |
| KR | 20150056960 | 5/2015 |
| KR | 10-1550481 | 9/2015 |

* cited by examiner

TOUCH PANEL AND DISPLAY APPARATUS INCLUDING THE SAME

CROSS-REFERENCE TO RELATED APPLICATION

This application claims priority from and the benefit of Korean Patent Application No. 10-2016-0009533, filed on Jan. 26, 2016, which is hereby incorporated by reference for all purposes as if fully set forth herein.

BACKGROUND

Field

Exemplary embodiments relate to a touch panel and a display apparatus including the touch panel. More particularly, exemplary embodiments relate to a touch panel with improved pattern visibility and a display apparatus including the touch panel.

Discussion of the Background

A touch panel is an input device in which a user can input a predetermined command by performing a touch using his/her finger or an object. Since such a touch panel can replace a separate input device, such as a keyboard and a mouse, the application range of the touch panel is being gradually expanded mainly in mobile devices.

A resistive type, a photosensitive type, a capacitive type, and the like are known as types of realizing a touch panel. Among them, the capacitive type touch panel, which is in currently in wide use, includes a number of touch electrodes, detects a point at which the capacitance is changed according to a contact with a finger of a person or an object, and thereby determines the position of the contact.

Touch electrodes provided to a capacitive type touch panel may have various shapes. The shapes of the touch electrodes are designed so as not to be easily recognized by users.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch panel and a display apparatus including the touch panel configured to prevent patterns of touch electrodes from being seen by a user.

Additional aspects will be set forth in the detailed description which follows, and, in part, will be apparent from the disclosure, or may be learned by practice of the inventive concept.

An exemplary embodiment discloses a display apparatus including: a display panel including a base member; a first touch electrode disposed on the base member and extending in a first direction; a second touch electrode including touch patterns spaced apart from one another in a second direction crossing the first direction and a bridge pattern connecting two of the touch patterns adjacent to each other in the second direction, the touch patterns being disposed on the base member and being spaced apart from the first touch electrode; and a dummy pattern disposed between the first touch electrode and the second touch electrode. The first touch electrode includes a first mesh pattern and first peripheral patterns protruding from the first mesh pattern, and a peripheral border of the first peripheral patterns has an obtuse angle or a curved shape.

An exemplary embodiment also discloses a touch panel including: a base member; a first touch electrode disposed on the base member and extending in a first direction; a second touch electrode including touch patterns spaced apart from one another in a second direction crossing the first direction and a bridge pattern connecting two of the touch patterns adjacent to each other in the second direction, the touch patterns being disposed on the base member and being spaced apart from the first touch electrode; and a dummy pattern disposed between the first touch electrode and the second touch electrode. The first touch electrode includes a first mesh pattern and first peripheral patterns protruding from the first mesh pattern, and a peripheral border of the first peripheral patterns has an obtuse angle or a curved shape.

An exemplary embodiment also discloses a display apparatus including: a display panel including a base member; a first touch electrode disposed on the base member and extending in a first direction; a second touch electrode including touch patterns spaced apart from one another in a second direction crossing the first direction and a bridge pattern connecting two of the touch patterns adjacent to each other in the second direction, the touch patterns being disposed on the base member and being spaced apart from the first touch electrode; and a dummy pattern disposed between the first touch electrode and the second touch electrode. The first touch electrode, the touch patterns, and the dummy pattern have shapes of rectangles and circles overlapping one another.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
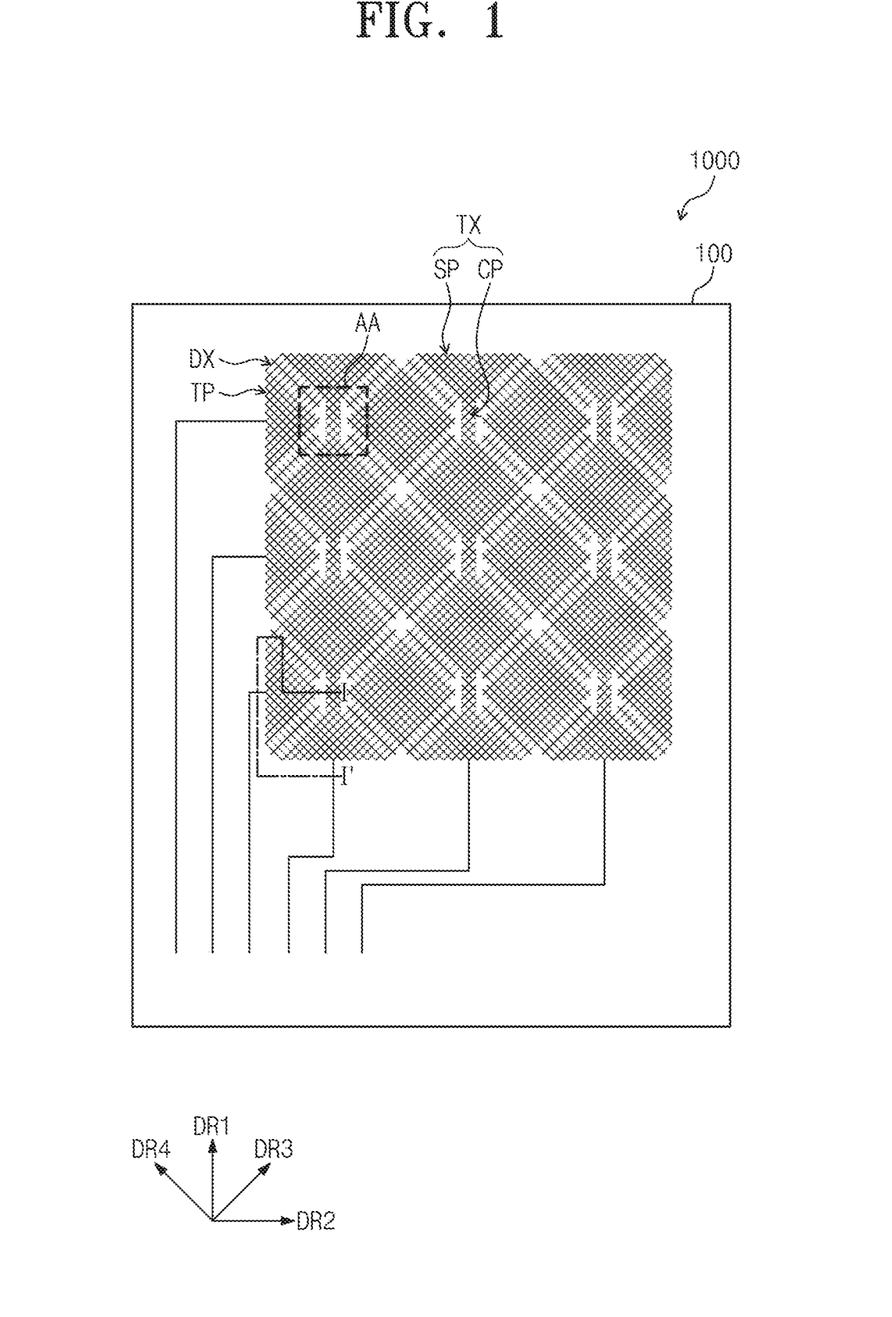
FIG. 1 is a schematic plan view of a touch panel according to an exemplary embodiment.
Figure 2:
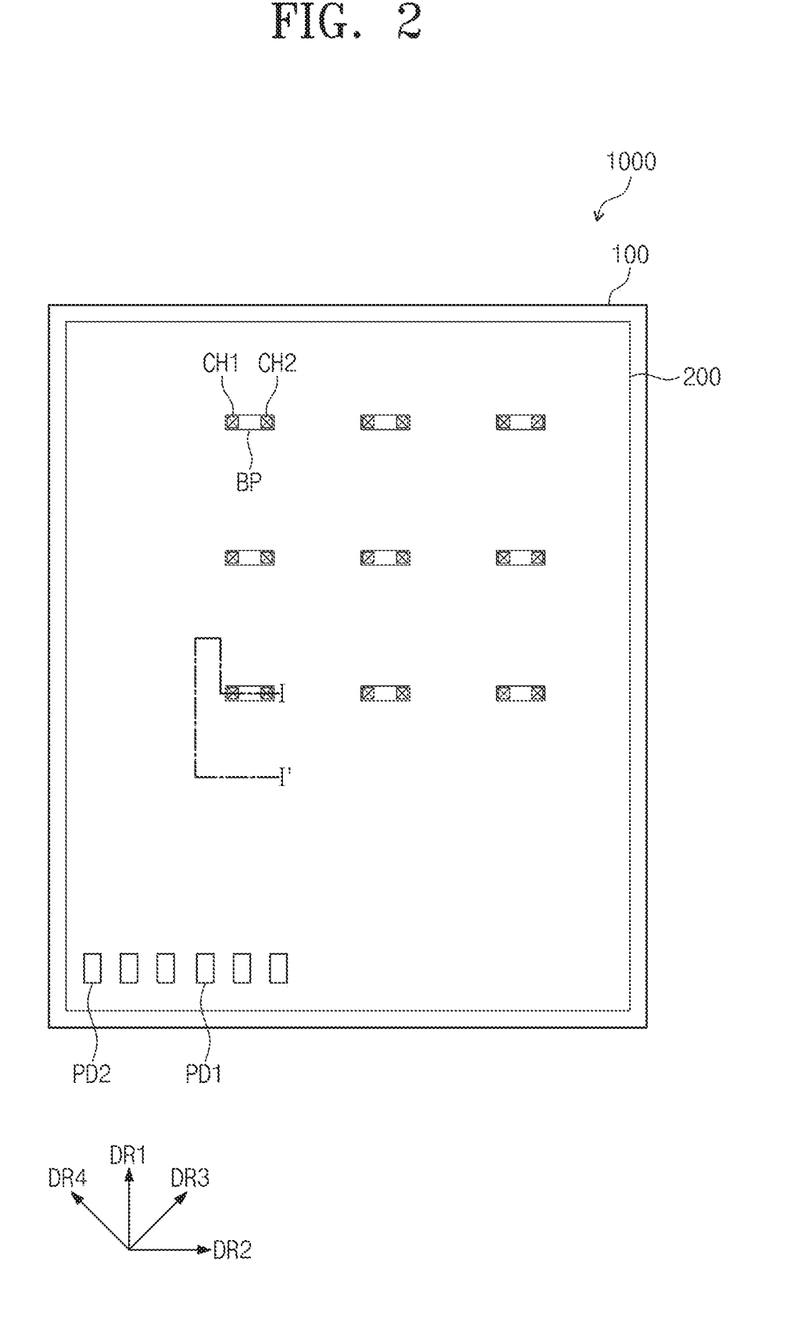
FIG. 2 is a schematic plan view of a touch panel according to an exemplary embodiment.
Figure 3:
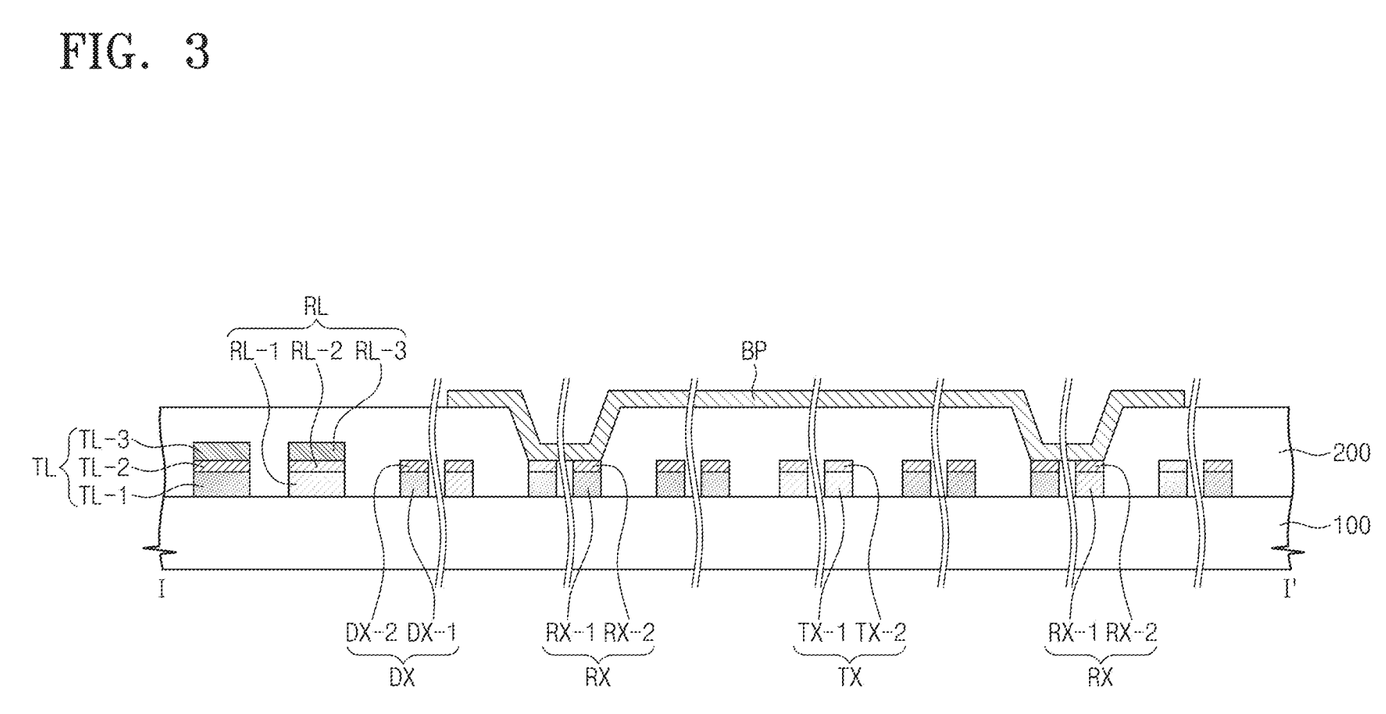
FIG. 3 is a cross-sectional view taken along sectional line I-I' of FIG. 1 and FIG. 2 according to an exemplary embodiment.

FIG. 1 is a schematic plan view of a touch panel according to an exemplary embodiment. FIG. 2 is a schematic plan view of a touch panel according to an exemplary embodiment. FIG. 3 is a cross-sectional view taken along sectional line I-I' of FIG. 1 and FIG. 2 according to an exemplary embodiment. FIG. 1 illustrates elements disposed on a base member 100, and FIG. 2 illustrates elements disposed on an insulation film 200.

Referring to FIG. 1, FIG. 2, and FIG. 3, a touch panel 1000 includes a base member 100, first touch electrodes TX, second touch electrodes RX, and dummy patterns DX.

The base member 100 is a place on which the first touch electrodes TX, the second touch electrodes RX, and the dummy patterns DX are positioned, and may be formed of various materials.

In FIG. 1 and FIG. 2, the base member 100 may have a rectangular shape having sides extending in a first direction DR1 and a second direction DR2 in a plan view.

The base member 100 may be formed of an insulative material, such as glass or polymer resin. The polymer resin may include, for example, polyethyleneterephthalate (PET) and polyimide (PI). Also, the base member 100 may be formed of a flexible material so as to be bendable or foldable and may have a single layer or multi-layer structure.

The touch panel 1000 may be coupled to a display panel for displaying an image to realize a touch screen function. The base member 100 may have transparency to allow light to pass through.

The first touch electrodes TX may be disposed on the base member 100. Each of the first touch electrodes TX may extend in the first direction DR1. The first touch electrodes TX may be arranged along the second direction DR2.

Each of the first touch electrodes TX may include sensing patterns SP having a mesh shape disposed in a diamond-shaped region and connecting patterns CP connecting sensing patterns SP adjacent to each other in the first direction DR1.

The first touch electrodes TX may include a conductive material.

The first touch electrodes TX may include a first lower conductive layer TX-1 and a first upper conductive layer TX-2. The first upper conductive layer TX-2 may be disposed on the first lower conductive layer TX-1. The first lower conductive layer TX-1 may include AgNW. The first upper conductive layer TX-2 may include a transparent conductive material, such as ITO or IZO. In an exemplary embodiment, the first touch electrodes TX have a double-layered structure, but the present invention is not limited thereto. The first touch electrodes TX may have a structure of a single layer or three or more layers having a conductive material.

The insulation film 200 may be widely disposed on the base member 100. The insulation film 200 may be disposed on the first touch electrodes TX. Also, the insulation film 200 may be disposed on other elements on the base member 100, such as first wirings TL and second wirings RL.

The insulation film 200 may be formed of various insulative materials, such as $SiO_x$ or $SiN_x$.

The second touch electrodes RX may be disposed on the base member 100. Each of the second touch electrodes RX may extend in the second direction DR2. The second touch electrodes RX may be arranged along the first direction DR1.

Each of the second touch electrodes RX may include touch patterns TP and bridge patterns BP.

The touch patterns TP may be spaced apart from one another in the second direction DR2. Each of the touch patterns TP may have a mesh shape disposed in a diamond-shaped region. The touch patterns TP may be disposed on the same layer as the first touch electrodes TX. The touch patterns TP may be disposed on the base member 100.

The bridge patterns BP may connect the touch patterns TP adjacent to each other in the second direction DR2. First and second contact holes CH1 and CH2 which respectively overlap both ends of each of bridge patterns BP may be provided to the insulation film 200. Each of bridge patterns BP may be connected to the adjacent touch patterns through the first and second contact holes CH1 and CH2.

The bridge patterns BP and the first touch electrodes TX may be disposed on a different layer. The bridge patterns BP may be insulated from the first touch electrodes TX and may be disposed on the insulation film 200.

The bridge patterns BP may be formed of a conductive material. For example, the bridge patterns BP may be formed of a transparent conductive material, such as ITO or IZO.

The second touch electrodes RX may include a conductive material.

The second touch electrodes RX may include a second lower conductive layer RX-1 and a second upper conductive layer RX-2. The second upper conductive layer RX-2 may be disposed on the second lower conductive layer RX-1. The second lower conductive layer RX-1 may be disposed on the same layer as the first lower conductive layer TX-1. The second upper conductive layer RX-2 may be disposed on the same layer as the first upper conductive layer TX-2. The second lower conductive layer RX-1 may include AgNW. The second upper conductive layer RX-2 may include a transparent conductive material, such as ITO or IZO. In an exemplary embodiment, the second touch electrodes RX have a double-layered structure, but the present invention is not limited thereto. The second touch electrodes RX may have substantially the same layer structure as the first touch electrode TX, such as a structure of a single layer or three or more layers.

The dummy patterns DX may be disposed between the first and second touch electrodes TX and RX in a plan view. The dummy patterns DX may extend in a third direction DR3 crossing the first and second directions DR1 and DR2, or may extend in a fourth direction DR4 crossing the first, second, and third directions DR1, DR2, and DR3. The dummy patterns DX may have mesh shapes.

The dummy patterns DX may be disposed on the same layer as the first touch electrodes TX and the touch patterns TP.

The dummy patterns DX may include a third lower conductive layer DX-1 and a third upper conductive layer DX-2. The third upper conductive layer DX-2 may be disposed on the third lower conductive layer DX-1. The third lower conductive layer DX-1 may be disposed on the same layer as the first lower conductive layer TX-1. The third upper conductive layer DX-2 may be disposed on the same layer as the first upper conductive layer TX-2. The third lower conductive layer DX-1 may include AgNW. The third upper conductive layer DX-2 may include a transparent conductive material, such as ITO or IZO. In an exemplary embodiment, the dummy patterns DX have a double-layered structure, but the present invention is not limited thereto. The dummy patterns DX may have substantially the same layer structure as the first touch electrode TX, such as a structure of a single layer or three or more layers.

The dummy patterns DX may be electrically floated. The dummy patterns DX may be disposed to prevent the patterns of the first touch electrodes TX and the touch patterns TP from being seen.

The touch panel 1000 may further include first wirings TL, second wirings RL, first pads PD1, and second pads PD2.

The first wirings TL may be connected to the first touch electrodes TX. The first wirings TL may be disposed on the same layer as the first touch electrodes TX. The first wirings TL may be disposed on a peripheral region of the base member 100. One end of each of the first wirings TL may be connected to one end of each of the first touch electrodes TX, and the other end of the first wirings TL may be connected to the first pads PD1.

The first wirings RL may include a fourth lower conductive layer TL-1, a fourth upper conductive layer TL-2, and a first metal layer TL-3. The fourth lower conductive layer TL-1, the fourth upper conductive layer TL-2, and the first metal layer TL-3 may be disposed in this order on the base member 100. The fourth lower conductive layer TL-1 may be disposed on the same layer as the first lower conductive layer TX-1. The fourth upper conductive layer TL-2 may be disposed on the same layer as the first upper conductive layer TX-2. The fourth lower conductive layer TL-1 may include AgNW. The fourth upper conductive layer TL-2 may include a transparent conductive material, such as ITO or IZO. The first metal layer TL-3 may be formed of a metallic material. The first wirings TL have the first metal layer TL-3 and may therefore have a lower resistance than the first touch electrodes TX and touch patterns TP.

The second wirings RL may be connected to the second touch electrodes RX. The second wirings RL may be disposed on the same layer as the first touch electrodes TX. The second wirings RL may be disposed on a peripheral region of the base member 100. One end of each of the second wirings RL may be connected to one end of each of the second touch electrodes RX, and the other end of the second wirings RL may be connected to the second pads PD2.

The second wirings RL may include a fifth lower conductive layer RL-1, a fifth upper conductive layer RL-2, and a second metal layer RL-3. The fifth lower conductive layer RL-1, the fifth upper conductive layer RL-2, and the second metal layer RL-3 may be disposed in this order on the base member 100. The fifth lower conductive layer RL-1 may be disposed on the same layer as the first lower conductive layer TX-1. The fifth upper conductive layer RL-2 may be disposed on the same layer as the first upper conductive layer TX-2. The fifth lower conductive layer RL-1 may include AgNW. The fifth upper conductive layer RL-2 may include a transparent conductive material, such as ITO or IZO. The second metal layer RL-3 may be formed of a metallic material. The second wirings RL have the second metal layer RL-3 and may therefore have a lower resistance than the first touch electrodes TX and touch patterns TP.

The first pads PD1 and the second pads PD2 may be disposed on the insulation film 200. The first pads PD1 and the second pads PD2 may be disposed on the same layer as the bridge pattern BP. The first pads PD1 and the second pads PD2 may be disposed on a peripheral region of the insulation film 200. Each of the first pads PD1 and the second pads PD2 may be respectively connected to each of the first and second touch electrodes TX and RX through contact holes (not shown) provided in the insulation film 200.

The touch panel 1000 may calculate a touch coordinate through the first and second pads PD1 and PD2 on the basis of the amount of change in the capacitance of a capacitor between the first and second touch electrodes TX and RX, the change being generated by a touch.

Figure 4:
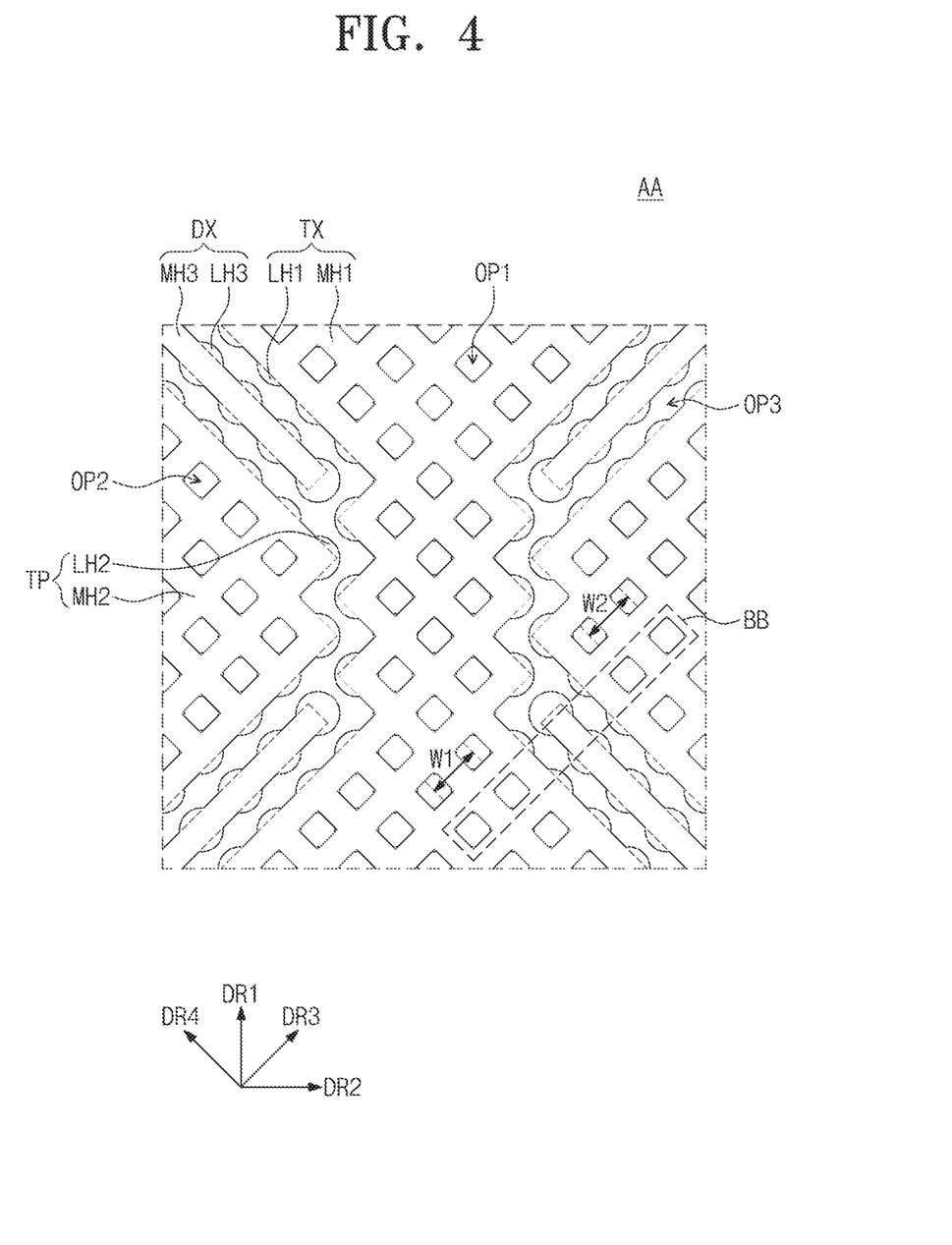
FIG. 4 is an enlarged plan view of a portion "AA" of the touch panel of FIG. 1 according to an exemplary embodiment.
Figure 5:
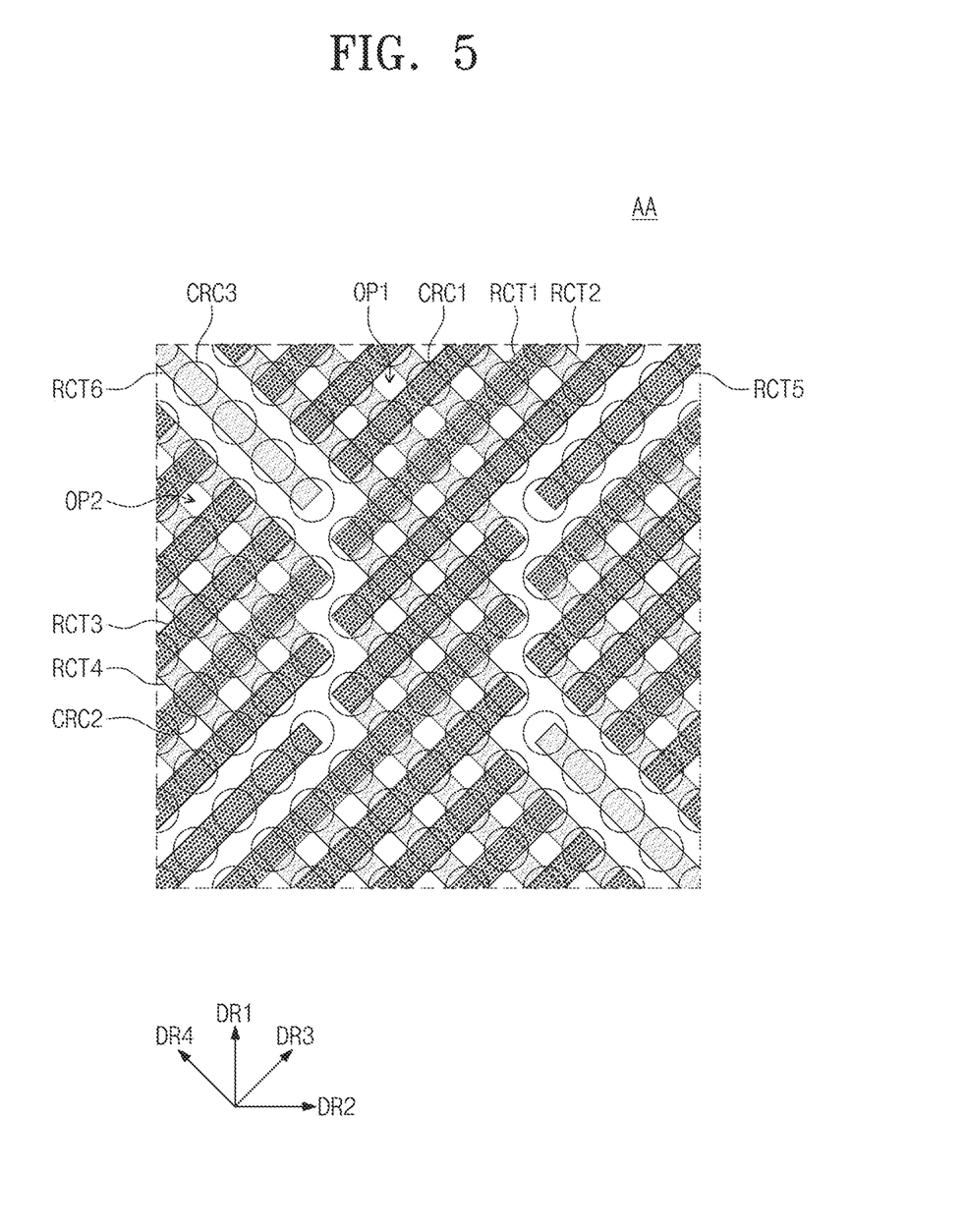
FIG. 5 is a schematic enlarged plan view of a portion "AA" of the touch panel of FIG. 1 according to an exemplary embodiment.

FIG. 4 is an enlarged plan view of a portion "AA" of the touch panel of FIG. 1 according to an exemplary embodiment. FIG. 5 is a schematic enlarged plan view of a portion "AA" of the touch panel of FIG. 1 according to an exemplary embodiment.

Referring to FIG. 4, each of the first touch electrodes TX may include a first mesh pattern MH1 and first peripheral patterns LH1. Hereinafter, for convenience of description, the first mesh pattern MH1 and the first peripheral patterns LH1 are separately described, but the first mesh pattern MH1 and the first peripheral patterns LH1 may substantially have an integral shape.

The first mesh pattern MH1 may have a shape in which first rectangles RCT1 and second rectangles RCT2 overlap each other. The first rectangles RCT1 may have long sides extending in the third direction DR3 and may be spaced apart from one another in the fourth direction DR4. The second rectangles RCT2 may have long sides extending in the fourth direction DR4 and may be spaced apart from one another in the third direction DR3. The distance between two of the first rectangles RCT1 adjacent to each other in the fourth direction DR4 and the distance between two of the second rectangles RCT2 adjacent to each other in the third direction DR3 may be substantially the same.

The first peripheral patterns LH1 may protrude from the first mesh pattern MH1 in a plan view. The peripheral border of the first peripheral patterns LH1 may be constituted of curves having no straight sides.

The first peripheral patterns LH1 may be portions of first circles CRC1 overlapping the first and second rectangles RCT1 and RCT2. The first circles CRC1 may be disposed at crossing portions of the first and second rectangles RCT1 and RCT2. The first circles CRC1 may be repeatedly disposed at regular intervals along the third and fourth directions DR3 and DR4. The peripheral borders of the first peripheral patterns LH1 may have arc shapes.

The first touch electrodes TX may have shapes in which the first rectangles RCT1, the second rectangles RCT2, and the first circles CRC1 overlap one another.

Figure 6:
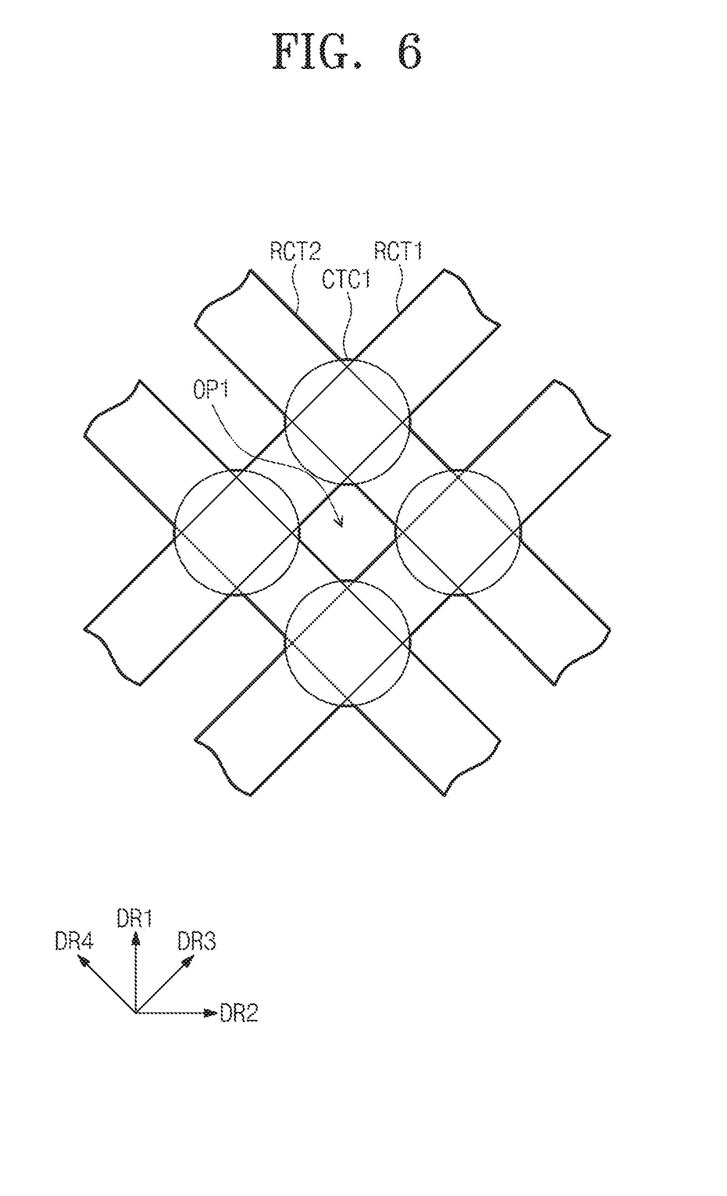
FIG. 6 is a schematic enlarged plan view of a portion of a first touch electrode of the touch panel according to an exemplary embodiment.

FIG. 6 is a schematic enlarged plan view of a portion of a first touch electrode of the touch panel according to an exemplary embodiment.

Referring to FIG. 4, FIG. 5, and FIG. 6, a plurality of first openings OP1 may be provided to the first touch electrodes TX. The first openings OP1 may be arranged at regular intervals along the third and fourth directions DR3 and DR4.

Each of the first openings OP1 may have a shape of a square in which four corners of the square, each of the four corners overlapping the first circles CRC1, are removed from the square, but the present invention is not limited thereto.

In another exemplary embodiment, the first peripheral patterns may be portions of ellipses overlapping the first and second rectangles RCT1 and RCT2. The peripheral border of the first peripheral patterns may have shapes of elliptical arcs.

Referring to FIG. 4, FIG. 5, and FIG. 6, each of the touch patterns TP may include a second mesh pattern MH2 and second peripheral patterns LH2. For convenience of description, the second mesh pattern MH2 and the second peripheral patterns LH2 are separately described, but the second mesh pattern MH2 and the second peripheral patterns LH2 may have an integral shape.

The second mesh pattern MH2 may have a shape in which third rectangles RCT3 and fourth rectangles RCT4 overlap each other. The third rectangles RCT3 may have long sides extending in the third direction DR3 and may be spaced apart from one another in the fourth direction DR4. When the third rectangles RCT3 are moved toward the third direction DR3, the first and third rectangles RCT1 and RCT3 may overlap one another.

The fourth rectangles RCT4 may have long sides extending in the fourth direction DR4 and may be spaced apart from one another in the third direction DR3. When the fourth rectangles RCT4 are moved toward the fourth direction DR4, the second and fourth rectangles RCT2 and RCT4 may overlap one another. The distance between two of the third rectangles RCT3 adjacent to each other in the fourth direction DR4 and the distance between two of the fourth rectangles RCT4 adjacent to each other in the third direction DR3 are substantially the same.

The second peripheral patterns LH2 may protrude from the second mesh pattern MH2 in a plan view. A peripheral border of the second peripheral patterns LH2 may be constituted of curves.

The second peripheral patterns LH2 may be portions of second circles CRC2 overlapping the third and fourth rectangles RCT3 and RCT4. The second circles CRC2 may be disposed at crossing portions of the third and fourth rectangles RCT3 and RCT4. The second circles CRC2 may be repeatedly disposed at regular intervals along the third and fourth directions DR3 and DR4. The peripheral borders of the second peripheral patterns LH2 may have arc shapes.

The touch patterns TP may have shapes in which the third rectangles RCT3, the fourth rectangles, and the second circles CRC2 overlap one another.

A plurality of second openings OP2 may be provided to the touch patterns TP. The second openings OP2 may be arranged at regular intervals along the third and fourth directions DR3 and DR4. The shape of the second openings OP2 may be substantially the same as that of the first openings OP1. Each of the second openings OP2 may have a shape of a square in which each of the four corners overlapping the second circles CRC2 are removed from the square.

A second distance W2 between two of the second openings OP2 adjacent to each other in the third direction DR3 or in the fourth direction DR4 may be substantially the same as the first distance W1 between two of the first openings OP1 adjacent to each other in the third direction DR3 or the fourth direction DR4.

Each of the first and second distances W1 and W2 may be about 100 μm or less. When each of the first and second distances W1 and W2 is greater than about 100 μm, the first and second openings Op1 and OP2 may be visible to a user.

Dummy patterns DX may include rectangular patterns MH3 and third peripheral patterns LH3. For convenience of description, the rectangular pattern MH3 and the third peripheral patterns LH3 are separately described, but the rectangular pattern MH3 and the third peripheral patterns LH3 may substantially have an integral shape.

The rectangular pattern MH3 may have a shape of a fifth rectangle RCT5 or a sixth rectangle RCT6. The fifth rectangle RCT5 may have long sides extending in the third direction DR3. When the fifth rectangle RCT5 is moved toward the third direction DR3, the first and fifth rectangles RCT1 and RCT5 may overlap each other.

The sixth rectangle RCT6 may have long sides extending in the fourth direction DR4. When the sixth rectangle RCT6 is moved toward the fourth direction DR4, the second and sixth rectangles RCT2 and RCT6 may overlap each other.

The third peripheral patterns LH3 may protrude from the rectangular patterns MH3. The peripheral borders of the third peripheral patterns LH3 may be constituted of curves.

The third peripheral patterns LH3 may be portions of the third circles CRC3 overlapping the fifth or sixth rectangles RCT5 or RCT6. The peripheral borders of the third peripheral patterns LH3 may have arc shapes. When the third circles CRC3 are moved toward the third direction DR3 or toward the fourth direction DR4, the moved third circles CRC3 may totally overlap the first and second circles CRC1 and CRC2.

Third openings OP3 may be provided between the dummy patterns DX and the first touch electrodes TX, between the dummy patterns DX and the touch patterns TP, and between the first touch electrodes TX and the touch patterns TP.

The position which is spaced apart a first distance W1 from the center of the first openings OP1 toward the third direction DR3 and toward the forth direction DR4 may be a position in any one of the first openings OP1, the second openings OP2, and the third openings OP3. For example, referring to a portion "BB" of FIG. 4, the positions which are spaced by the first distance W1 from the center of the first openings OP1 in the third direction DR3, are the positions in the third openings OP1, in the third openings OP3, in the third openings OP3, in the second openings OP2, and in the second openings OP2 in this order.

The first, second, and third openings OP1, OP2, and OP3 may have similar shapes due to the shapes of the first touch electrodes TX, the touch patterns TP, and the dummy patterns DX. According to the touch panel 1000 of an exemplary embodiment, the first touch electrodes TX, the touch patterns TP, and the dummy patterns DX may be prevented from being seen by a user.

Figure 7:
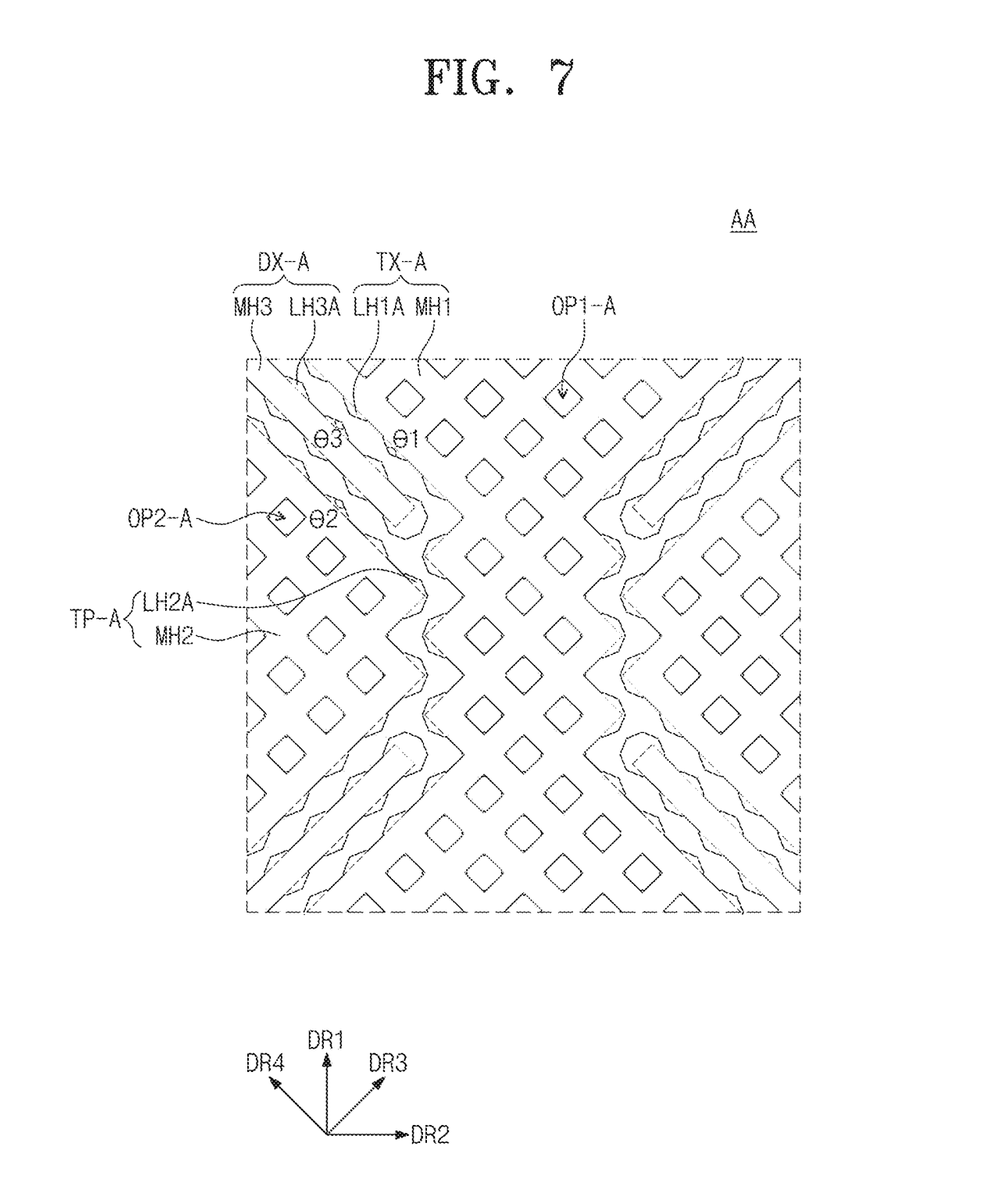
FIG. 7 is an enlarged plan view of a portion "AA" of the touch panel of FIG. 1 according to another exemplary embodiment.
Figure 8:
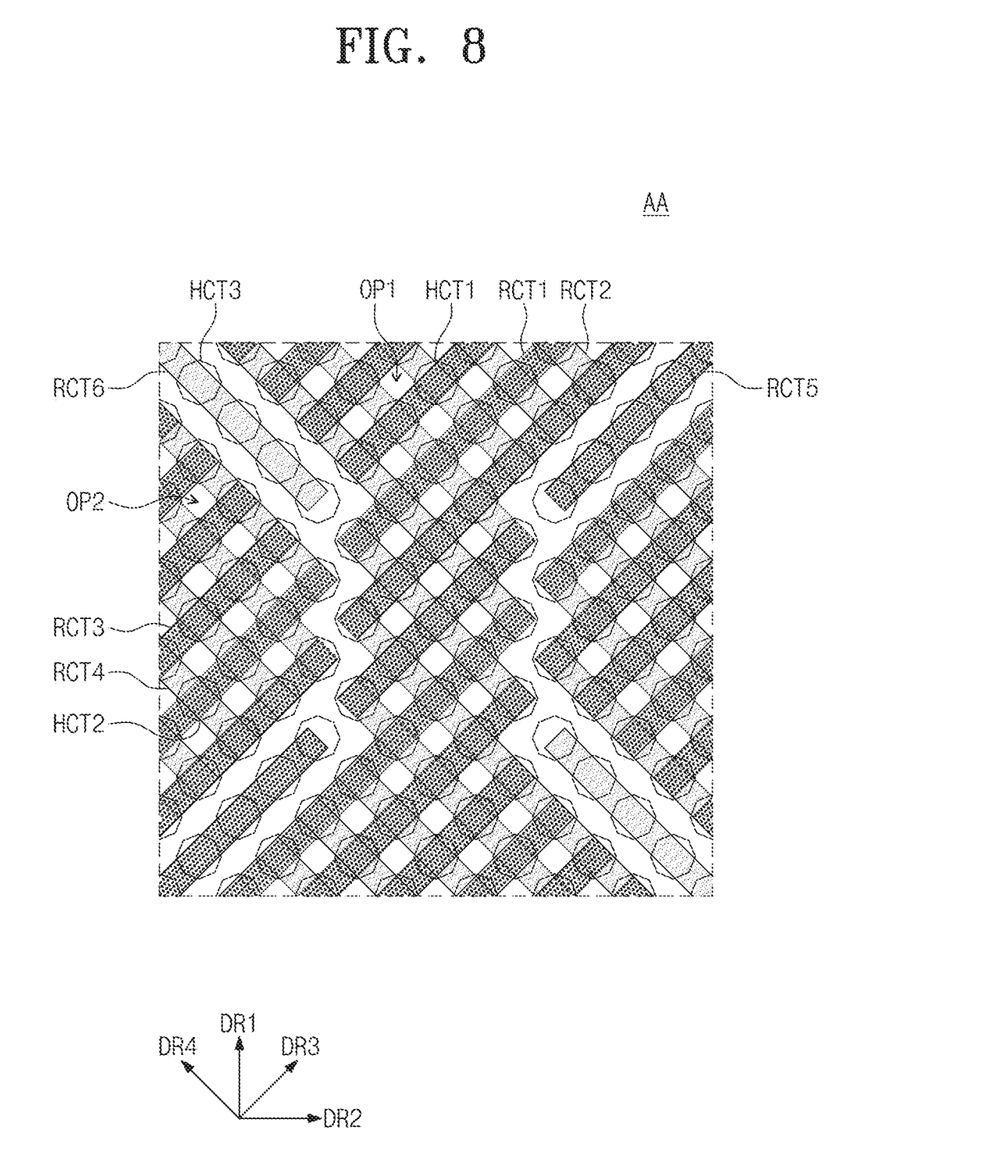
FIG. 8 is a schematic enlarged plan view of a portion "AA" of the touch panel of FIG. 1 according to another exemplary embodiment.

FIG. 7 is an enlarged plan view of a portion "AA" of the touch panel of FIG. 1 according to another exemplary embodiment. FIG. 8 is a schematic enlarged plan view of a portion "AA" of the touch panel of FIG. 1 according to another exemplary embodiment.

First touch electrodes TX-A, touch patterns TP-A, and dummy patterns DX-A to be described with reference to FIG. 7 are different in shapes of peripheral patterns, and the remaining elements are substantially the same, in comparison with the first touch electrodes TX, the touch patterns TP, and the dummy patterns DX described with reference to FIG. 4, FIG. 5, and FIG. 6. Hereinafter, the shapes of the peripheral patterns will be mainly described, and non-described constituents are given the same reference symbols as those in FIG. 4, FIG. 5, and FIG. 6 and follow the descriptions related to FIG. 4, FIG. 5 and FIG. 6.

Each of the first touch electrodes TX-A may include a first mesh pattern MH1 and first peripheral patterns LH1A. Each of the touch patterns TP-A may include a second mesh pattern MH2 and second peripheral patterns LH2A. Each of dummy patterns DX-A may include a rectangular pattern MH3 and third peripheral patterns LH3A.

The first peripheral patterns LH1A may protrude from the first mesh pattern MH1 in a plan view. The second peripheral patterns LH2A may protrude from the second mesh pattern MH2 in a plan view. The third peripheral patterns LH3A may protrude from the rectangular pattern MH3 in a plan view. In an exemplary embodiment, peripheral borders of the first peripheral patterns LH1A may have an obtuse angle θ1, peripheral borders of the second peripheral patterns LH2A may have an obtuse angle θ2, and peripheral borders of the third peripheral patterns LH3A may have an obtuse angle θ3.

The first peripheral patterns LH1A may be portions of first polygons HCT1 overlapping the first and second rectangles RCT1 and RCT2. The second peripheral patterns LH2A may be portions of second polygons HCT2 overlapping the third and fourth rectangles RCT3 and RCT4. The third peripheral patterns LH3A may be portions of third polygons HCT3 overlapping the fifth and sixth rectangles RCT5 and RCT6.

The first, second, and third polygons HCT1, HCT2, and HTC3 may have substantially the same sizes and shapes. In FIG. 8, each of the first, second, and third polygons HCT1, HCT2, and HCT3 is exemplarily illustrated to have a shape of a regular octagon, however, the present invention is not limited thereto. If the peripheral borders of the first, second, and third polygons HCT1, HCT2, and HCT3 have obtuse angles, the shapes of the first, second, and third polygons HCT1, HCT2, and HCT3 may be variously changed.

Each of first openings OP1-A provided to the first touch electrodes TX-A may have a shape of a square in which four corners of the square overlapping the first polygons HCT1 are removed from the square. Each of second openings OP2-A provided to the touch panels TP-A may have a shape of a square in which four corners of the square overlapping the second polygon HCT2 are removed from the square.

Figure 9:
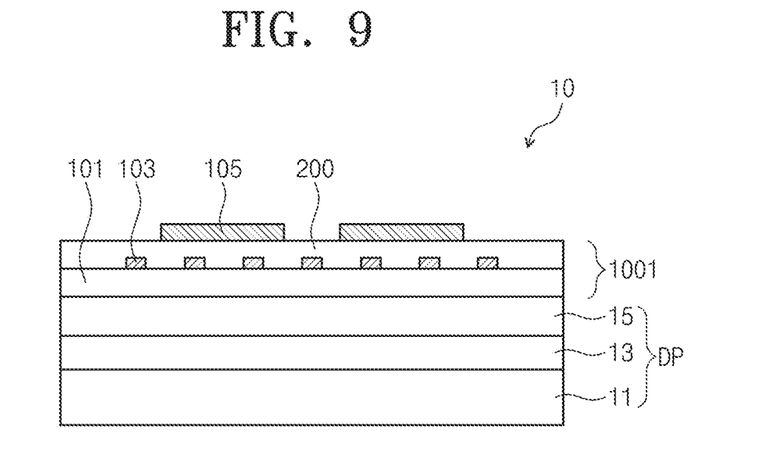
FIG. 9 is a cross-sectional view of a display apparatus according to an exemplary embodiment.

FIG. 9 is a cross-sectional view of a display apparatus according to an exemplary embodiment.

Referring to FIG. 9, a display apparatus 10 may include a display panel DP and a touch panel 1001.

The display panel DP displays an image corresponding to input image data. The display panel DP may be an organic luminescent display panel, an electrophoretic display panel, an electro-wetting display panel, a liquid crystal display panel or the like, and the kinds thereof are not limited thereto. Hereinafter, the display panel DP will be exemplarily described as an organic luminescent display panel.

The display panel DP may include a substrate 11, a pixel layer 13, and an encapsulation layer 15.

The substrate 11 may be a flexible substrate, and may be formed of a plastic having good heat resistance and durability, such as polyethyleneetherphthalate, polyethylenenaphthalate, polycarbonate, polyarylate, polyetherimide, polyethersulphone, or polyimide, however, the present invention is not limited thereto. The substrate 11 may be formed of various materials such as metal or glass.

The pixel layer 13 may be disposed between the substrate 11 and the encapsulation layer 15. The pixel layer 13 may include organic luminescent elements (not shown) and driving elements (not shown) for driving the organic luminescent elements. The driving elements (not shown) may include thin-film transistors and various wirings. The organic luminescent elements (not shown) may include anodes, organic luminescent layers, and cathodes. Holes and electrons are injected into the organic luminescent layers from the anodes and cathodes. In the organic layer, excitons which are combinations of the holes and the electrons are formed, and light is emitted while the excitons fall from excited states to ground states.

The encapsulation layer 15 may be disposed on the pixel layer 13. The encapsulation layer 15 may prevent the organic luminescent elements included in the pixel layer 13 from being exposed to external water or air.

The encapsulation layer 15 may be provided in a shape of a laminated film of organic films and inorganic films, however, the present invention is not limited thereto. The encapsulation layer 15 may be provided as a substrate formed of glass or plastic.

The touch panel 1001 may be coupled on the display panel DP. The touch panel 1001 may include a touch substrate 101, a first electrode layer 103, a second electrode layer 105, and an insulation film 200.

The touch substrate 101 may be substantially the same as the base member 100 described with reference to FIGS. 1 to 8. The touch substrate 101 may be disposed on the encapsulation layer 15. The first electrode layer 103 may include the first touch electrodes TX or TX-A, the touch patterns TP or TP-A, the dummy patterns DX or DX-A, the first wirings TL, and the second wirings RL which are described with reference to FIGS. 1 to 8. The second electrode layer 105 may include the bridge patterns BP, the first pads PD1, and the second pads PD2.

Although not shown, the display apparatus 10 may further include a planarized layer and a window disposed on the touch panel 1001.

Figure 10:
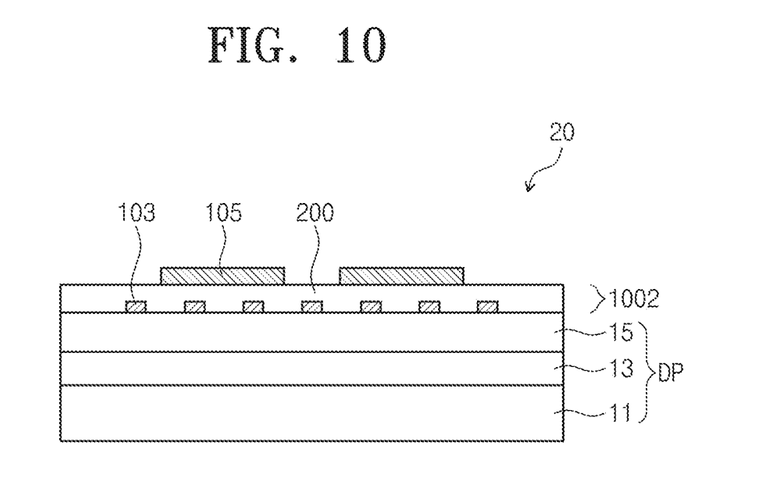
FIG. 10 is a cross-sectional view of a display apparatus according to another exemplary embodiment.

FIG. 10 is a cross-sectional view of a display apparatus according to another exemplary embodiment.

A display apparatus 20 illustrated in FIG. 10 is different in a touch panel 1002 and the remaining elements are substantially the same in comparison with the display apparatus 10 illustrated in FIG. 9.

The touch panel 1002 of FIG. 10 differs from the touch panel 1001 of FIG. 9 in that the touch substrate 101 is omitted. Accordingly, a first electrode layer 103 may be directly disposed on an encapsulation layer 15. The encapsulation layer 15 may be substantially the same as the base member 100 described with reference to FIGS. 1 to 8.

According to exemplary embodiments, patterns of touch electrodes may be prevented from being seen by a user.

Although the embodiments of the present invention have been disclosed for illustrative purposes, those skilled in the art will appreciate that a variety of different modifications and variations are possible, without departing from the scope and spirit of the invention. Accordingly, such modifications and variations should also be understood as falling within the claims of the present invention.

What is claimed is:

1. A display apparatus, comprising:
a display panel comprising a base member;
a first touch electrode disposed on the base member and extending in a first direction;
a second touch electrode comprising touch patterns spaced apart from one another in a second direction crossing the first direction and a bridge pattern connecting two of the touch patterns adjacent to each other in the second direction, the touch patterns being disposed on the base member and spaced apart from the first touch electrode; and
a dummy pattern disposed between the first touch electrode and the second touch electrode,
wherein:
the first touch electrode comprises a first mesh pattern and first peripheral patterns spaced apart from each other and protruding from the first mesh pattern to the dummy pattern;
the second touch electrode comprises a second mesh pattern and second peripheral patterns protruding from the second mesh pattern to the dummy pattern;
the dummy pattern comprises a rectangular pattern extended to a third direction crossing the first and the second directions or a fourth direction crossing the first, second, and third directions and third peripheral patterns protruding from the rectangular pattern, and the third peripheral patterns directly contacting to the rectangular pattern and spaced apart from each other;
one of the third peripheral patterns faces one of the first peripheral patterns, one of the second peripheral patterns, and another one of the first peripheral patterns and the second peripheral patterns; and
the one of the third peripheral patterns has a shape of one of a circular arc, an elliptical arc, and a portion of a regular octagon.

2. The display apparatus of claim 1, wherein an entire peripheral border of the second peripheral patterns comprises straight sides and an obtuse angle.

3. The display apparatus of claim 2, wherein:
each of the first mesh pattern and the second mesh pattern has a shape of first rectangles and second rectangles overlapping one another;
the first rectangles have long sides extending in the third direction and are spaced apart from one another in the fourth direction; and
the second rectangles have long sides extending in the fourth direction and are spaced apart from one another in the third direction.

4. The display apparatus of claim 3, wherein a peripheral border of the third peripheral patterns has an obtuse angle.

5. The display apparatus of claim 4, wherein an entire peripheral border of the third peripheral patterns comprises straight sides and an obtuse angle.

6. The display apparatus of claim 4, wherein:
first openings are provided in the first touch electrode;
second openings are provided in each of the touch patterns; and
each of the first openings and each of the second openings have a shape of a square in which four corners of the square are removed, each of the four corners overlapping the circle.

7. The display apparatus of claim 6, wherein:
the first openings are regularly arranged along the third direction; and
the second openings are regularly arranged along the fourth direction.

8. The display apparatus of claim 6, wherein a first distance between two of the first openings adjacent to each other in the third direction or the fourth direction and a second distance between two of the second openings adjacent each other in the third direction or the fourth direction are substantially the same.

9. The display apparatus of claim 8, wherein each of the first distance and the second distance is about 100 μm or less.

10. The display apparatus of claim 4, wherein each of the first, second, and third peripheral patterns have a shape of a portion of a regular octagon.

11. The display apparatus of claim 10, wherein:
first openings are provided in the first touch electrode;
second openings are provided in each of the touch patterns; and
each of the first openings and each of the second openings have a shape of a square in which four corners of the square are removed, each of the four corners overlapping the regular octagon.

12. The display apparatus of claim 1, wherein the dummy pattern is electrically floated.

13. The display apparatus of claim 1, wherein the first touch electrode and each of the touch patterns comprise:
a lower conductive layer disposed on the base member and comprising AgNW; and
an upper conductive layer disposed on the lower conductive layer and comprising ITO or IZO.

14. The display apparatus of claim 1, wherein the first touch electrode, the touch patterns, and the dummy pattern are disposed on the same layer.

15. The display apparatus of claim 1, further comprising an insulation film disposed on the first touch electrode, the touch patterns, and the dummy pattern,
wherein the bridge pattern is disposed on the insulation film and is connected to the touch patterns through contact holes provided in the insulation film.

16. A touch panel, comprising:
a base member;
a first touch electrode disposed on the base member and extending in a first direction;
a second touch electrode disposed on the base member and extending in a second direction crossing the first direction; and
a dummy pattern insulated from the first touch electrode and the second touch electrode,
wherein:
the first touch electrode comprises a first mesh pattern where a plurality of first openings are defined and a plurality of first peripheral patterns protruding from a side of the second mesh pattern, the first openings are arrayed in a third direction crossing the first and the second directions and a fourth direction crossing the first, the second, and the third directions, and each of the first peripheral patterns protrudes to the third or the fourth directions from the side of the first mesh pattern;
the second touch electrode comprises a second mesh pattern where a plurality of second openings are defined and a plurality of second peripheral patterns protruding from a side of the second mesh pattern, the second openings are arrayed in the third and the fourth directions, and each of the second peripheral patterns protrudes to the third or the fourth directions from the side of the second mesh pattern;
the dummy pattern comprises a rectangular pattern extending in the third or the fourth directions and a plurality of third peripheral patterns protruding from a side of the rectangular pattern in the third or the fourth directions;
the first mesh patterns and the second mesh patterns respectively surround the first and the second opening;
the side of the rectangular pattern extends in the third direction or the fourth direction;
each of the third peripheral patterns faces each of the first peripheral patterns or each of the second peripheral patterns in the third or the fourth directions;
each of the third peripheral patterns overlaps each of the first peripheral patterns and the second peripheral patterns when viewed in the third or the fourth directions,
each of the third peripheral patterns protruding in the third direction does not overlap the first openings or the second openings when viewed in the third direction, and
each of the third peripheral patterns protruding in the fourth direction does not overlap the first openings or the second openings when viewed in the fourth direction.

17. The touch panel of claim 16, wherein an entire peripheral border of the second peripheral patterns comprises straight sides and an obtuse angle.

18. The touch panel of claim 16, wherein the side of the first mesh pattern and the first peripheral patterns are arranged alternately along the fourth direction.

* * * * *